United States Patent [19]

Würth

[11] Patent Number: 4,973,873
[45] Date of Patent: Nov. 27, 1990

[54] ELECTRIC MACHINE

[75] Inventor: Hans Würth, Ludwigsburg, Fed. Rep. of Germany

[73] Assignee: Robert Bosch GmbH, Stuttgart, Fed. Rep. of Germany

[21] Appl. No.: 74,537

[22] PCT Filed: Sep. 23, 1986

[86] PCT No.: PCT/DE86/00389
§ 371 Date: Jun. 12, 1987
§ 102(e) Date: Jun. 12, 1987

[87] PCT Pub. No.: WO87/02839
PCT Pub. Date: May 7, 1987

[30] Foreign Application Priority Data

Nov. 5, 1985 [DE] Fed. Rep. of Germany ....... 3539131

[51] Int. Cl.$^5$ ............................................. H02K 1/12
[52] U.S. Cl. ..................................... 310/254; 310/180
[58] Field of Search ................ 310/179, 180, 190–194, 310/207, 254, 40

[56] References Cited

U.S. PATENT DOCUMENTS

| 3,328,617 | 6/1967 | Preece | 310/180 |
| 3,449,606 | 6/1969 | Preece | 310/254 X |
| 3,597,644 | 8/1971 | Preece | 310/40 |
| 3,818,585 | 6/1974 | Preece | 310/254 X |

FOREIGN PATENT DOCUMENTS 843571 7/1949 Fed. Rep. of Germany.
1375722 11/1974 United Kingdom.

Primary Examiner—Mark O. Budd
Attorney, Agent, or Firm—Michael J. Striker

[57] ABSTRACT

An electric machine for cranking devices of internal combustion engines includes a housing in which pole pairs carry a wave winding. The pole pairs are arranged so as to be offset relative to one another in the direction of the longitudinal axis of the housing. The constructional length of the electric machine and the work material requirement for the wave winding can accordingly be reduced without the reduction of power of the electric machine.

1 Claim, 1 Drawing Sheet

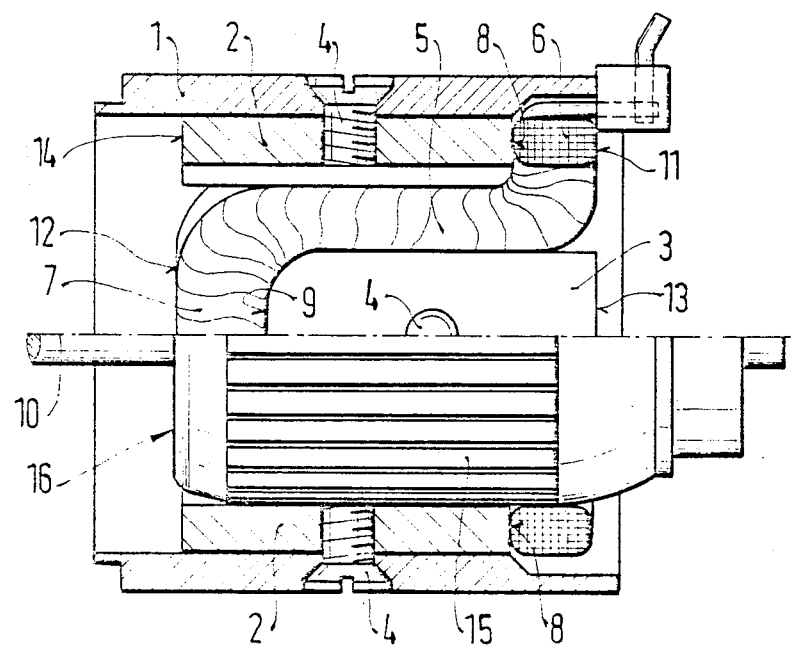

ELECTRIC MACHINE

BACKGROUND OF THE INVENTION

The invention relates to a DC electric machine. Numerous electric machines comprising a wave winding are already known. However, because of the two winding ends resulting from of the wave winding, they have the disadvantage of having a greater constructional length than electric machines comprising an exciting winding formed from individual coils, each of which is assigned to a pole. Also, wave windings have a greater average winding length than the corresponding windings formed from coils. However, wave windings have an advantage over windings which are composed of individual coils in that they are substantially less costly to produce because they require no high-cost connecting and wiring steps.

SUMMARY OF THE INVENTION

The invention has the object of providing an electric machine of the type mentioned above which machine ensures less work material to be used and lower assembly costs and has a shortened constructional length, so that it is also suitable for cranking devices for installing in available spaces in motor vehicles, which spaces are becoming increasingly smaller.

Compared to the known electric machines, it is advantageous that only by means of pairs of poles which are offset relative to one another in the direction of the longitudinal axis of the housing, and, accordingly, likewise in the longitudinal direction, relative to the armature of the electric machine, a smaller constructional length of the electric machine, which comprises a wave winding whose average winding length is shortened so that the work material requirement for the winding can accordingly also be smaller, is made possible without the power of the electric machine being substantially reduced. In an advantageous manner, the pole pairs are reciprocally arranged, in each instance, at half the height of a winding end so as to be eccentric relative to the armature stampings of the armature of the electric machine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing shows a portion of an electric machine partly in longitudinal section.

DETAILED DESCRIPTION OF THE PREFERRED EMBODIMENT

As seen in the drawing, four poles, which are located opposite one another as two pole pairs 2 and 3, are accommodated in a housing 1 of an electric machine, for example, for a cranking device for internal combustion engines. The pole pairs 2 and 3 are screwed in the housing 1 with screws 4. The pole pairs 2 and 3 carry an exciting winding which is constructed as a wave winding 5 and has portions 6 and 7, which extend substantially in the circumferential direction and form winding ends and contact the front side 8 or 9 of the pole pairs 2 and 3. The pole pairs 2 and 3 are arranged so as to be offset in the direction of the longitudinal axis 10 of the housing 1 and, accordingly, of the electric machine, in such a way that the front side 11 or 12 of the portions 6 and 7 of the wave winding 5 lies in the plane, in each instance, with the front side 13 or 14 of the pole pairs 2 or 3. The front side 13 or 14 has no winding, the aforementioned plane extending perpendicularly relative to the longitudinal axis 10 of the electric machine. The pole pairs 2 and 3 are offset relative to one another by the height of a winding end. This results in such arrangement of the pole pairs 2 and 3 in the housing 1 that they are reciprocally eccentrically offset by half the height of the winding end relative to the center of an armature stamping 15 of an armature 16 which extends through the wave winding 5 concentrically relative to the longitudinal axis 10. Accordingly, the winding ends 6 and the ends of the pole pair 3 project over a front side of the armature stampings 15, and the winding ends 7 and the free ends of the pole pair 2 project over the other front side of the armature stampings 15 by approximately half the height of the winding end in the direction of the longitudinal axis 10, respectively. The constructional length of the electric machine is accordingly reduced by the height of the winding end without the power of the electric machine being reduced to a considerable extent. The wave winding 5 likewise has a shorter average winding length, which results in a saving of work material for the wave winding. Accordingly, wave windings can also be used in electric machines in an inexpensive manner compared to windings formed from individual coils.

It will be understood that each of the elements described above, or two or more together, may also find a useful application in other types of electric machines differing from the types described above.

While the invention has been illustrated and described as embodied in an electric machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An electric machine, comprising a housing having an axis; first and second pole pairs arranged in said housing; a wave winding wound around said first and second pole pairs and having first and second axially spaced winding ends having an equal axial dimension, said first and second pole pairs being axially offset relative to each other by the axial dimension of said first and second winding ends; and an armature stamping having axially opposite end faces; each of said first and second pole pairs having axially opposite first and second end faces and each of said first and second winding ends having axially opposite end surfaces, the first end surface of said first winding end lying with the first end face of said first pole pair in a first common plane extending perpendicular to the housing axis, and the second end surface of said first winding end abutting the first end face of said second pole pair, the first end surface of said second winding end abutting the second end face of said first pole pair, and the second end surface of said second winding end lying with the second end face of said second pole pair in a second common plane extending perpendicular to the housing axis, said opposite end faces of said armature stamping being spaced from said first and second common planes, respectively, by a half of the axial dimension of said first and second winding ends.

* * * * *